United States Patent
Mizuno et al.

(10) Patent No.: US 12,472,873 B2
(45) Date of Patent: Nov. 18, 2025

(54) MONITORING DEVICE

(71) Applicant: TOYOTA JIDOSHA KABUSHIKI KAISHA, Toyota (JP)

(72) Inventors: Yuko Mizuno, Nagoya (JP); Makoto Matsushita, Ichinomiya (JP); Hayato Mizuma, Tokyo (JP); Kohei Miwa, Shizuoka-ken (JP); Naoki Yamada, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 18/431,143

(22) Filed: Feb. 2, 2024

(65) Prior Publication Data
US 2024/0391386 A1    Nov. 28, 2024

(30) Foreign Application Priority Data

May 24, 2023 (JP) .................................. 2023-085550

(51) Int. Cl.
*B60R 1/20* (2022.01)
*B60R 11/04* (2006.01)
*H04N 21/2343* (2011.01)
*H04N 21/433* (2011.01)

(52) U.S. Cl.
CPC ................ *B60R 1/20* (2022.01); *B60R 11/04* (2013.01); *H04N 21/234381* (2013.01); *H04N 21/4334* (2013.01)

(58) Field of Classification Search
None
See application file for complete search history.

(56) References Cited

U.S. PATENT DOCUMENTS

| | | | |
|---|---|---|---|
| 9,507,245 B1* | 11/2016 | Druker | F16M 13/02 |
| 10,958,833 B2* | 3/2021 | Park | H04N 23/951 |
| 2002/0183905 A1 | 12/2002 | Maeda et al. | |
| 2017/0111587 A1* | 4/2017 | Herbst | B60R 1/29 |
| 2017/0225628 A1* | 8/2017 | Aich | B60R 11/04 |
| 2017/0227162 A1* | 8/2017 | Saika | G03B 15/006 |
| 2022/0321762 A1* | 10/2022 | Nakagawa | H04N 23/667 |
| 2023/0004067 A1* | 1/2023 | Lan | H04N 23/57 |
| 2023/0199195 A1* | 6/2023 | Pettersson | H04N 19/107 |
| | | | 375/240.12 |
| 2024/0152199 A1* | 5/2024 | Lavy | H04N 23/65 |

FOREIGN PATENT DOCUMENTS

| | | |
|---|---|---|
| JP | 2002-362435 A | 12/2002 |
| JP | 2023-045448 A | 4/2023 |

* cited by examiner

*Primary Examiner* — Gelek W Topgyal
(74) *Attorney, Agent, or Firm* — SoraIP, Inc.

(57) ABSTRACT

A monitoring device includes an in-vehicle mount and a stationary mount as mounts to and from which an imaging unit configured to take a video is able to be attached and detached. The imaging unit is configured to automatically switch the operation mode according to the mount on which the imaging unit is mounted in such a manner that the imaging unit operates in the in-vehicle operation mode when the imaging unit is mounted on the in-vehicle mount, and operates in the stationary operation mode when the imaging unit is mounted on the stationary mount.

6 Claims, 2 Drawing Sheets

MONITORING DEVICE

CROSS-REFERENCE TO RELATED APPLICATION

This application claims priority to Japanese Patent Application No. 2023-085550 filed on May 24, 2023, incorporated herein by reference in its entirety.

BACKGROUND

1. Technical Field

The present disclosure relates to monitoring devices.

2. Description of Related Art

As a monitoring device for a vehicle, there is a dashcam that records the view inside and outside the vehicle, such as that disclosed in Japanese Unexamined Patent Application Publication No. 2023-45448 (JP 2023-45448 A). Some dashcams have a parking monitoring function.

SUMMARY

When a user does not use the parking monitoring function, the dashcam is not needed while the vehicle is parked.

A monitoring device that solves the above problem is a monitoring device including an imaging unit configured to take a video. The monitoring device includes an in-vehicle mount and a stationary mount to and from which the imaging unit is able to be attached and detached. The imaging unit has two operation modes: an in-vehicle operation mode and a stationary operation mode. The imaging unit is configured to automatically switch the operation mode according to the mount on which the imaging unit is mounted in such a manner that the imaging unit operates in the in-vehicle operation mode when the imaging unit is mounted on the in-vehicle mount, and operates in the stationary operation mode when the imaging unit is mounted on the stationary mount.

The monitoring device is advantageous in that the imaging unit that is used as a dashcam when mounted on the vehicle can also be installed in a location other than in the vehicle and used as a stationary monitoring camera.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
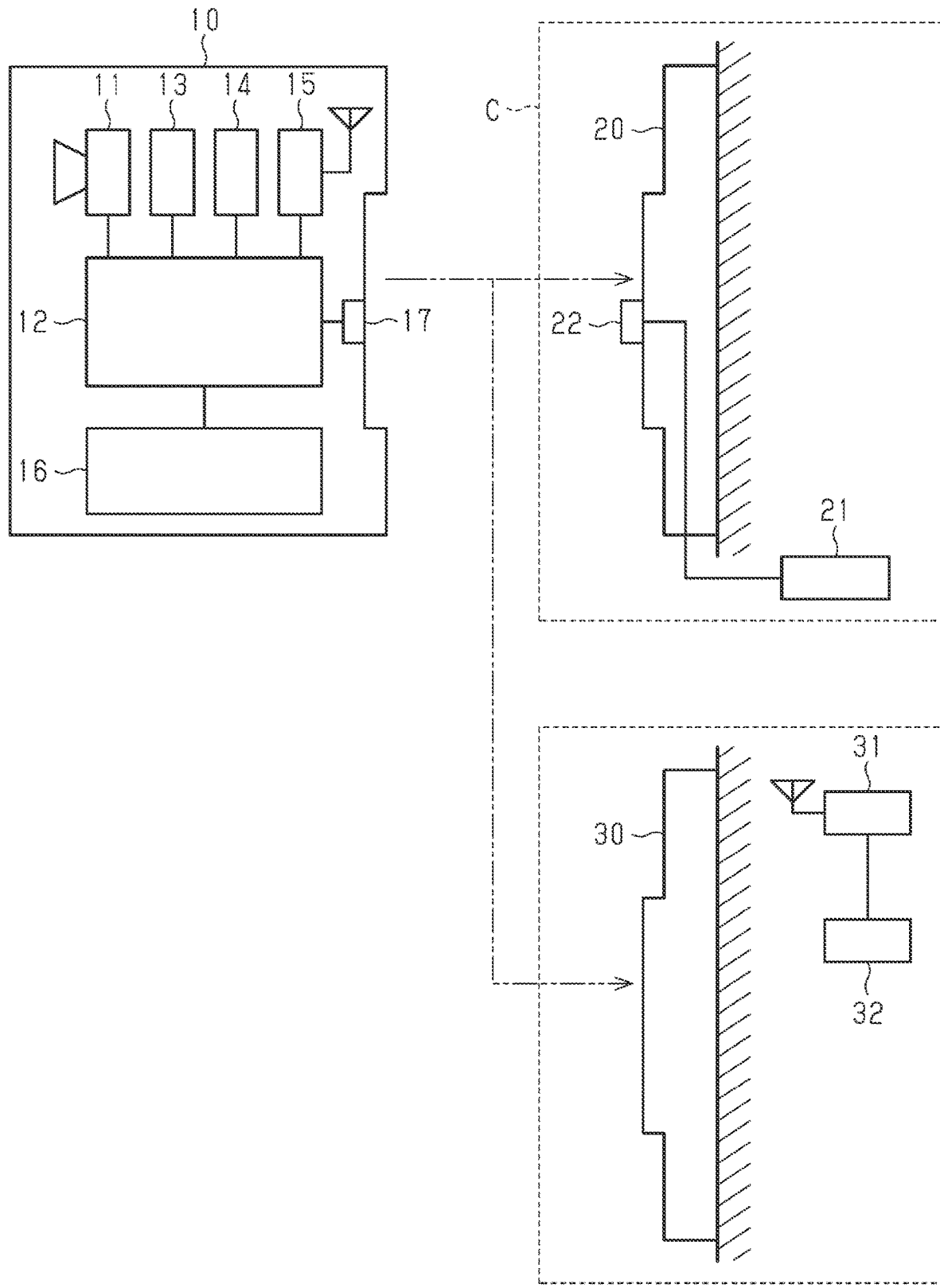
FIG. 1 is a diagram schematically showing the configuration of an embodiment of a monitoring device.

Hereinafter, one embodiment of the monitoring device will be described in detail with reference to FIGS. 1 and 2.

Configuration of Monitoring Device

First, the configuration of the monitoring device of this embodiment will be explained with reference to FIG. 1. As shown in FIG. 1, the monitoring device of the present embodiment includes an imaging unit 10 for capturing an image.

The imaging unit 10 includes a camera 11, a control circuit 12, a built-in storage 13, and an impact sensor 14. The camera 11 converts the image into an electrical signal and outputs it. Examples of the camera 11 include a Charge-Coupled Device (CCD) camera and a Complementary Metal-Oxide-Semiconductor (CMOS) camera. The control circuit 12 is a circuit that controls the operation of the imaging unit 10. The control circuit 12 also has the function of an image control circuit that processes signals from the camera 11. The built-in storage 13 is a storage medium contained in the monitoring device. The impact sensor 14 is a sensor that detects an impact applied to the imaging unit 10. Note that the built-in storage 13 need only be contained in the monitoring device while in use. For example, a removable memory card may be used as the built-in storage 13.

The imaging unit 10 is provided with a wireless communication module 15 for performing wireless communication with the outside. Further, the imaging unit 10 has a built-in battery 16 and a terminal 17 for external power supply. The imaging unit 10 is configured to be operable by both power charged in the built-in battery 16 and power supplied from the outside through the terminal 17.

The monitoring device includes an in-vehicle mount 20 and a stationary mount 30 as mounts to which the imaging unit 10 can be attached and detached. The in-vehicle mount 20 is a mount for installing the imaging unit 10 in the vehicle C for use as a dashcam. The stationary mount 30 is a mount for installing the imaging unit 10 in a place other than the vehicle C, such as a house, for use as an indoor or outdoor surveillance camera. The imaging unit 10 is used while being attached to either the in-vehicle mount 20 or the stationary mount 30.

The in-vehicle mount 20 is fixed to the vehicle C while being connected to an in-vehicle power supply 21. The in-vehicle mount 20 is provided with a terminal 22 that is connected to the terminal 17 of the imaging unit 10 when the imaging unit 10 is attached. The imaging unit 10 can thus receive power from the in-vehicle power supply 21 when attached to the in-vehicle mount 20.

On the other hand, a wireless LAN access point 31 is installed in a house or the like where the stationary mount 30 is installed. The imaging unit 10 becomes capable of wireless communication with the outside by establishing a wireless LAN connection to the access point 31 through the wireless communication module 15. An external storage 32 is connected to the access point 31. The external storage 32 is a storage medium installed outside the monitoring device. Examples of external storage 32 include network attached storage (NAS) and cloud storage.

The imaging unit 10 has a mount attachment detection function that detects attachment to either the in-vehicle mount 20 or the stationary mount 30. The mount attachment detection function can be implemented, for example, by providing the imaging unit 10 with a press switch that is pressed by the mount when the camera is attached to the mount. Further, the imaging unit 10 has a mount identification function that identifies whether the mount to which the imaging unit 10 is attached is the in-vehicle mount 20 or the stationary mount 30. In the case of this embodiment, of both mounts, only the in-vehicle mount 20 is provided with a terminal 22 for external power supply. Therefore, the control circuit 12 can identify the mount by determining that the vehicle is mounted on the in-vehicle mount 20 when power is supplied from the outside through the terminal 17, and that the vehicle is mounted on the stationary mount 30 when there is no power supply.

Switching of Operation Mode

The imaging unit 10 starts recording operation when mounted on either the in-vehicle mount 20 or the stationary mount 30. The recording operation of the imaging unit 10 will be described below.

Figure 2:
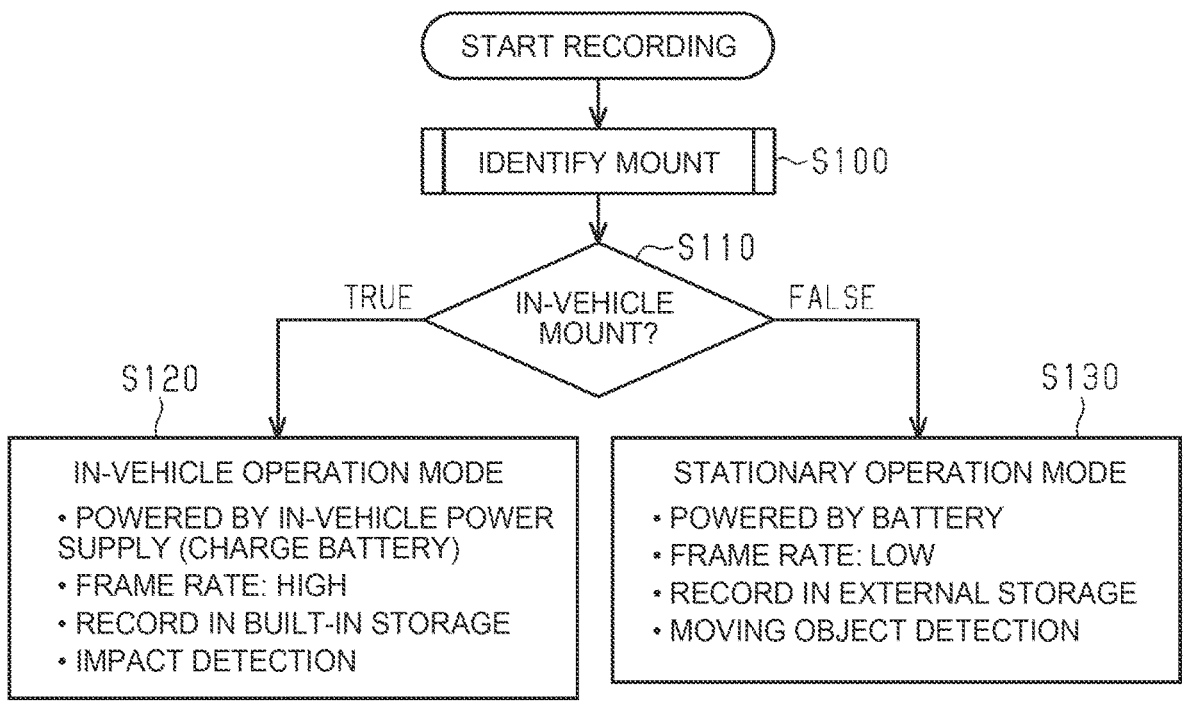
FIG. 2 is a flowchart of an operation mode switching routine executed by the monitoring device.

FIG. 2 shows the flow of processing executed by the control circuit 12 of the imaging unit 10 at the start of the recording operation. In the case of this embodiment, the control circuit 12 starts the process shown in FIG. 2 in response to detection of mounting on the mount. At the start of the recording operation, the control circuit 12 first performs mount identification. That is, the control circuit 12 identifies whether the mount to which the imaging unit 10 is mounted is the in-vehicle mount 20 or the stationary mount 30 (S100). Then, if the imaging unit 10 is mounted on the in-vehicle mount 20 (S110: TRUE), the control circuit 12 starts recording in the in-vehicle operation mode (S120). Furthermore, when the imaging unit 10 is mounted on the stationary mount 30 (S110: FALSE), the control circuit 12 starts recording in the stationary operation mode (S130).

The in-vehicle operation mode is an operation mode for using the imaging unit 10 as a dashcam. The imaging unit 10 in the in-vehicle operation mode operates as follows. The imaging unit 10 in the in-vehicle operation mode operates using power from the in-vehicle power supply 21 connected via the in-vehicle mount 20. At this time, the imaging unit 10 charges the built-in battery 16 with the power supplied from the in-vehicle power supply 21. The control circuit 12 in the in-vehicle operation mode performs the recording operation in the manner described below. That is, the control circuit 12 in the in-vehicle operation mode records recorded data of images taken by the camera 11 in the built-in storage 13. The control circuit 12 performs loop recording and event recording in response to impact detection. Loop recording is a recording method that erases and overwrites the oldest part of the recorded data when the recorded data recorded in the storage exceeds a certain amount. Event recording in response to impact detection is a recording method in which when an impact is detected by the impact sensor 14, recorded data before and after the impact is recorded in the storage. The control circuit 12 in the in-vehicle operation mode also performs recording at a higher frame rate than in the stationary operation mode.

The stationary operation mode is an operation mode for using the imaging unit 10 as a stationary surveillance camera. The imaging unit 10 in the stationary operation mode operates as follows. The imaging unit 10 in the stationary operation mode operates using electric power charged by the built-in battery 16. Further, the imaging unit 10 in the stationary operation mode operates while being wirelessly connected to the access point 31. The control circuit 12 in the stationary operation mode performs the recording operation in the following manner. That is, the control circuit 12 in the stationary operation mode records the recorded data in the external storage 32. The control circuit 12 in the stationary operation mode performs loop recording and event recording in response to moving object detection. Event recording in response to moving object detection is a recording method in which when movement is confirmed in an image taken by the camera 11, recorded data before and after the movement is recorded in the storage.

Functions and Effects of Embodiment

The operation and effects of this embodiment will be explained. The monitoring device of this embodiment includes the in-vehicle mount 20 and a stationary mount 30 as mounts to which the imaging unit 10 for taking a video can be attached and detached. The imaging unit 10 has two operation modes: an in-vehicle operation mode and a stationary operation mode. Then, the imaging unit 10 automatically switches the operation mode as follows, depending on the mount to which it is attached. That is, the imaging unit 10 automatically switches the operation mode so that the imaging unit 10 operates in the in-vehicle operation mode when it is mounted on the in-vehicle mount 20, and operates in the stationary operation mode when it is mounted on the stationary mount 30.

According to the monitoring device of this embodiment described above, the following effects can be achieved.

(1) The imaging unit 10, which is used as a dashcam when mounted on the vehicle C, can be installed at a location other than the vehicle C and used as a stationary monitoring camera.

(2) The recording operation of the imaging unit 10 suitable for each use varies depending on whether it is used as a dashcam or as a stationary monitoring camera. In this regard, in the case of the monitoring device of the above embodiment, the operation mode of the imaging unit 10 is automatically switched in accordance with attachment to the mount. Therefore, the recording operation of the imaging unit 10 can be switched to an operation suitable for the purpose without the user having to manually switch the recording operation.

(3) The imaging unit 10 performs event recording in response to impact detection during operation in the in-vehicle operation mode, and performs event recording in response to moving object detection during operation in the stationary operation mode. Therefore, event recording can be performed using a method suitable for each application.

(4) The imaging unit 10 performs recording at a lower frame rate during operation in the stationary operation mode than during operation in the in-vehicle operation mode. When the camera 11 is used as a stationary surveillance camera, the image taken by the camera 11 changes less than when it is used as a dashcam. Therefore, recording can be performed at a frame rate suitable for each purpose. For example, by lowering the frame rate in the stationary operation mode, the recording capacity of recorded data and power consumption can be reduced.

(5) The monitoring device of this embodiment includes the built-in storage 13 and has a connection function to the wireless LAN access point 31. The imaging unit 10 records recorded data in the built-in storage 13 when operating in the in-vehicle operation mode. Further, the imaging unit 10 records video recording data in an external storage 32 connected via the access point 31 when operating in the stationary operation mode. Therefore, the following effects can be obtained. First, there is an effect that the recording capacity of recorded data in the in-vehicle operation mode is increased compared to the case where the recorded data in the stationary operation mode is also recorded in the built-in storage 13. Furthermore, since the recorded data is recorded in the external storage 32 during the stationary operation mode, there is an advantage that even if the imaging unit 10 is stolen, the recorded data can be left behind. Furthermore, since the storages in which the recorded data are recorded are different, there is an effect that the recorded data in the in-vehicle operation mode and the recorded data in the stationary operation mode can be clearly distinguished and recorded.

(6) The imaging unit 10 in the monitoring device of this embodiment includes a built-in battery 16. The imaging unit 10 is configured to operate on the power from the in-vehicle power supply 21 connected via the in-vehicle mount 20 during operation in the in-vehicle operation mode, and to operate on the power charged in the built-in battery 16 during operation in the stationary operation mode. Therefore, stationary monitoring can be performed outdoors without any wiring work or the like. Furthermore, since the built-in battery 16 is being charged during use as a dashcam, downtime of the imaging unit 10 for charging is less likely to occur.

Other Embodiments

The above embodiment can be modified and implemented as follows. This embodiment and the following modified examples can be implemented in combination with each other within a technically consistent range.

- The monitoring device may be configured so that the imaging unit 10 operates by external power supply even in the stationary operation mode. For example, the monitoring device may be configured such that the stationary mount 30 is connected to a solar power generator or a commercial power supply to supply power to the imaging unit 10 in the stationary operation mode.
- The built-in storage 13 and the impact sensor 14 may be installed on the in-vehicle mount 20. Alternatively, the wireless communication module 15 may be installed on a stationary mount 30.
- Recorded data may be recorded in the built-in storage 13 even in the stationary operation mode. In that case, the wireless communication module 15 can be omitted.

If it is possible to carry out wireless communication via a mobile communication network etc. even while the vehicle C is running, the imaging unit 10 may be configured to record the recorded data in the in-vehicle operation mode to an external storage. good. In that case, the built-in storage 13 can be omitted.

- Recording may be performed at the same frame rate in both the in-vehicle operation mode and the stationary operation mode.

Moving object detection may be performed using a method other than the above. For example, a sonic wave detector may be installed on the imaging unit 10 or the stationary mount 30, and moving object detection may be performed by sonic wave detection.

- In at least one of the in-vehicle operation mode and the stationary operation mode, loop recording may not be performed and only event recording may be performed.

The in-vehicle mount 20 and the stationary mount 30 may be identified by the imaging unit 10 using a method other than that described above. For example, the in-vehicle mount 20 and the stationary mount 30 are each provided with a communication function. Then, when the imaging unit 10 is attached, the mount may be identified by notifying the control circuit 12 of which mount the imaging unit 10 is attached to.

What is claimed is:

1. A monitoring device comprising:
    an imaging unit including a control circuit and a camera configured to take a video;
    an in-vehicle mount, by which the imaging unit is configured to be installed in a vehicle; and
    a stationary mount, by which the imaging unit is configured to be installed in a place other than the vehicle, wherein:
    the imaging unit is configured to be selectively mounted on either the in-vehicle mount or the stationary mount,
    each of the in-vehicle mount and the stationary mount is configured to allow the imaging unit to be attached and detached, and has a function to communicate with the control circuit,
    the in-vehicle mount is configured to send a first notification to the control circuit that the imaging unit is mounted on the in-vehicle mount when the imaging unit is attached to the in-vehicle mount,
    the stationary mount is configured to send a second notification to the control circuit that the imaging unit is mounted on the stationary mount when the imaging unit is attached to the stationary mount, and
    the control circuit is configured to execute a process of automatically switching between an in-vehicle operation mode and a stationary operation mode, the process including:
        determining whether the imaging unit is mounted on the in-vehicle mount or the stationary mount based on which of the first notification or the second notification is received by the control circuit;
        operating the imaging unit in the in-vehicle operation mode in response to determining that the imaging unit is mounted on the in-vehicle mount; and
        operating the imaging unit in the stationary operation mode in response to determining that the imaging unit is mounted on the stationary mount.

2. The monitoring device according to claim 1, wherein:
    the imaging unit is configured to perform event recording in response to impact detection during operation in the in-vehicle operation mode; and
    the imaging unit is configured to perform event recording in response to moving object detection during operation in the stationary operation mode.

3. The monitoring device according to claim 1, wherein the imaging unit is configured to perform recording at a lower frame rate during operation in the stationary operation mode than during operation in the in-vehicle operation mode.

4. The monitoring device according to claim 1, wherein:
    the monitoring device has a function to connect to a wireless local area network access point; and
    the imaging unit is configured to record recorded data in a built-in storage of the monitoring device during operation in the in-vehicle operation mode, and to record the recorded data in an external storage connected via the access point during operation in the stationary operation mode.

5. The monitoring device according to claim 1, wherein:
    the imaging unit includes a built-in battery; and
    the imaging unit is configured to operate on power from an in-vehicle power supply connected via the in-vehicle mount and charge the built-in battery with the power during operation in the in-vehicle operation mode, and to operate on the power charged in the built-in battery during operation in the stationary operation mode.

6. The monitoring device according to claim 1, wherein:
the imaging unit has a first switch and a second switch,
the first switch is configured to be pressed by the in-vehicle mount when the imaging unit is mounted on the in-vehicle mount,
the second switch is configured to be pressed by the stationary mount when the imaging unit is mounted on the stationary mount; and
the control circuit is configured to
- detect that the imaging unit is mounted on the in-vehicle mount when it detects that the first switch is pressed,
- detect that the imaging unit is mounted on the stationary mount when it detects that the second switch is pressed, and
- determine whether the imaging unit is mounted on the in-vehicle mount or the stationary mount after detecting that the imaging unit is mounted on the in-vehicle mount or the stationary mount.

* * * * *